United States Patent
Horvath

[15] 3,643,968
[45] Feb. 22, 1972

[54] GASKET
[72] Inventor: Guy E. Horvath, Williamsville, N.Y.
[73] Assignee: Hercules Packing Corporation, Alden, N.Y.
[22] Filed: Dec. 24, 1969
[21] Appl. No.: 887,988

[52] U.S. Cl. ........................... 277/166, 277/180, 277/231
[51] Int. Cl. ........................................................ F16j 15/00
[58] Field of Search .................. 277/166, 180, 10, 11, 184, 277/231, 235 B

[56] References Cited

UNITED STATES PATENTS

| | | | |
|---|---|---|---|
| 1,753,129 | 4/1930 | Molden | 277/71 |
| 1,956,183 | 4/1934 | Victor | 277/166 X |
| 3,291,506 | 12/1966 | Blakeley | 277/206 X |

FOREIGN PATENTS OR APPLICATIONS

| | | | |
|---|---|---|---|
| 602,988 | 1/1926 | France | 277/166 |
| 596,157 | 7/1959 | Italy | 277/231 |

Primary Examiner—Samuel B. Rothberg
Attorney—John L. Hutchinson, William Lohff and Alan M. Abrams

[57] ABSTRACT

A gasket comprising in combination an elastomeric member and a resilient support member of sidewalls spaced from each other and a bottom wall joining such sidewalls at lower positions thereof and together with such sidewalls defining a cavity in which the elastomeric member is maintained in a supportive arrangement.

10 Claims, 9 Drawing Figures

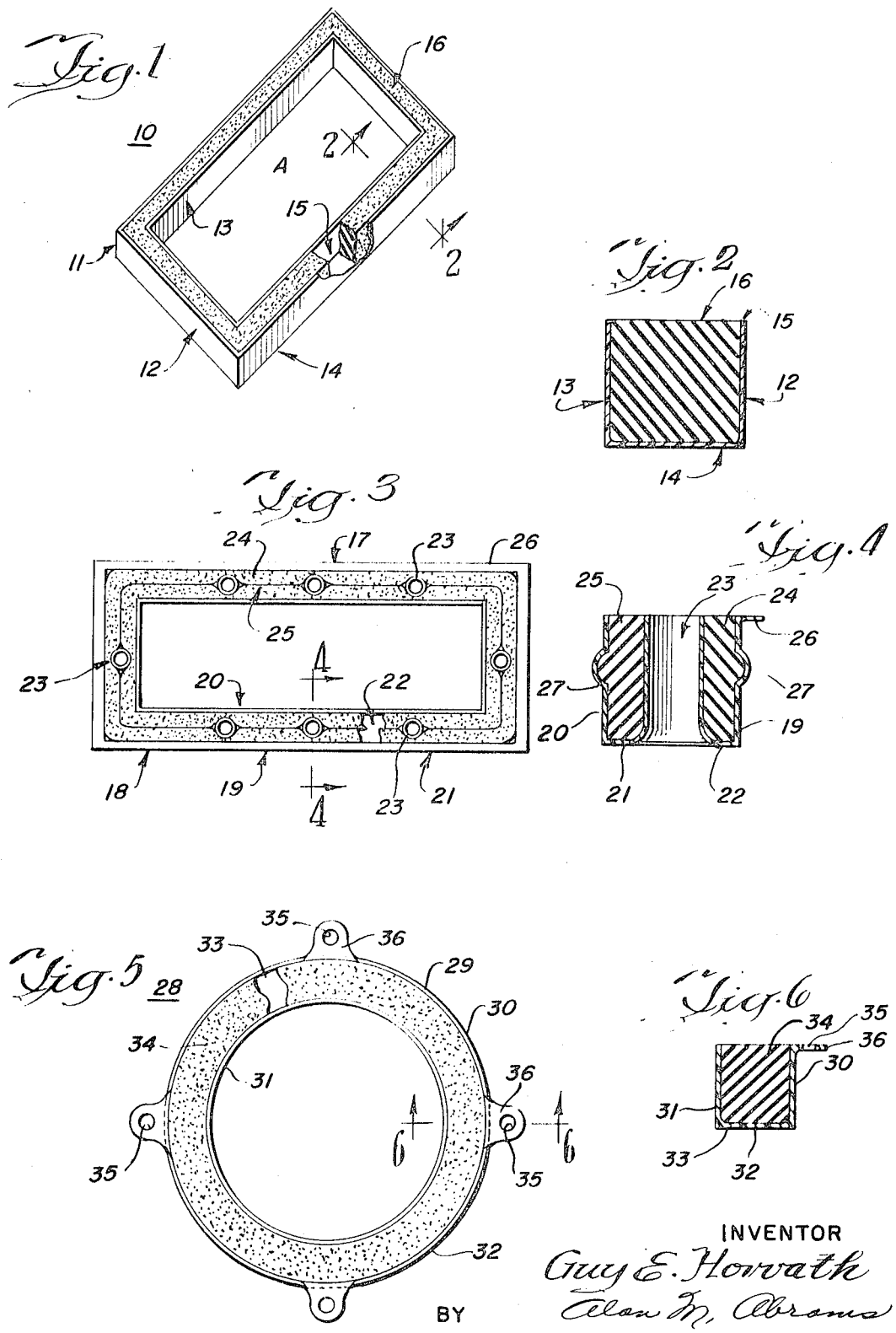

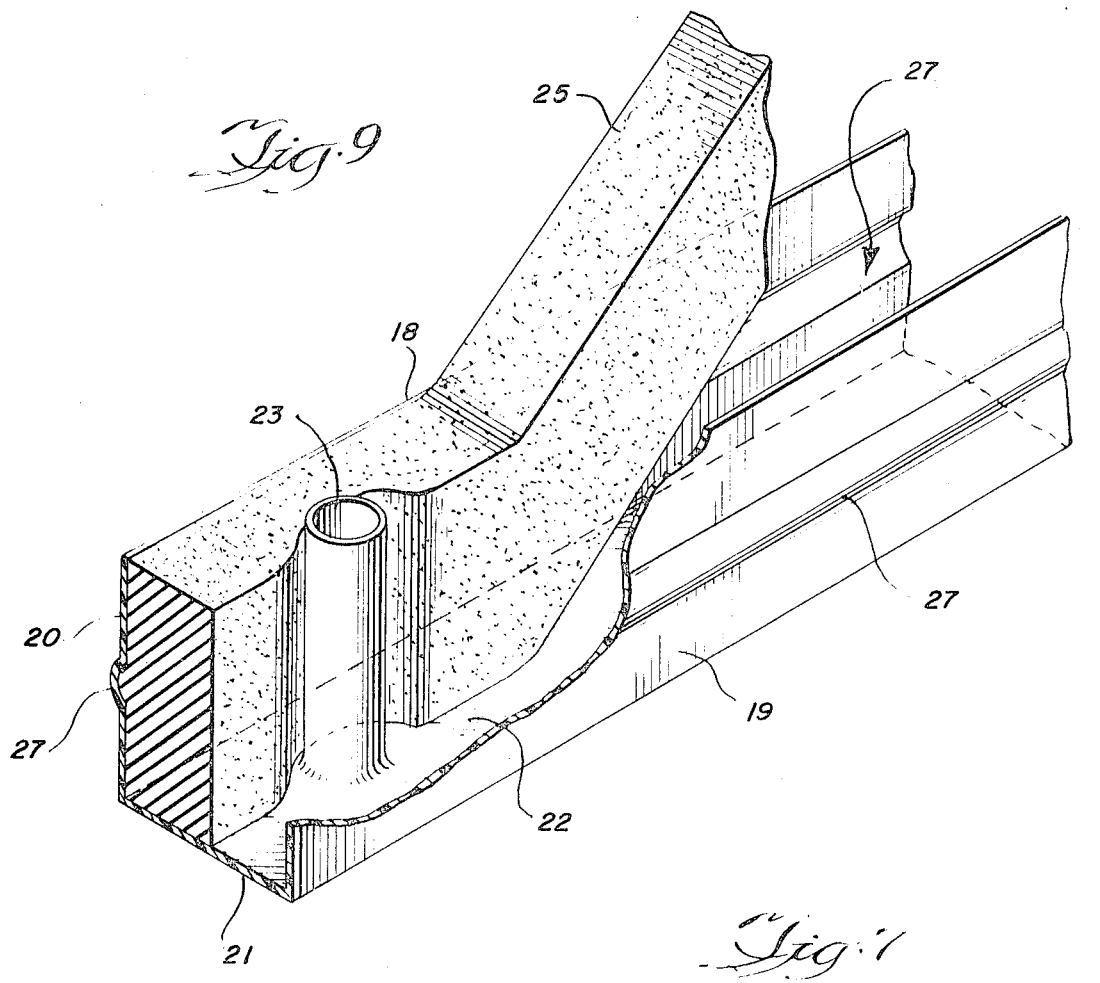
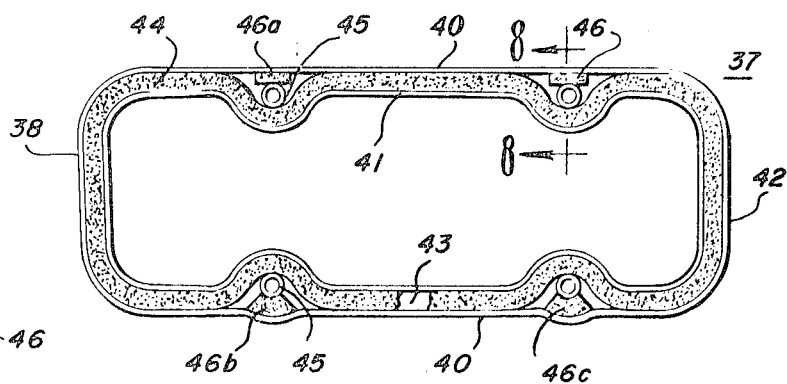
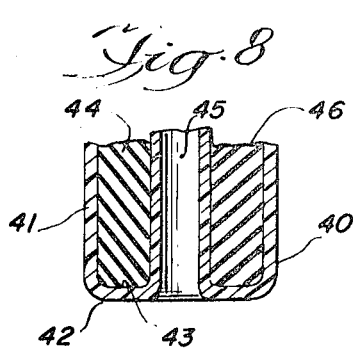

3,643,968

GASKET

This invention relates to a novel gasket structure as well as to a method for preparing such gasket structure.

One requirement for gaskets is that they must be maintained under elevated temperatures for long periods of time exposed to various liquids such as motor oils. This poses certain problems for such gaskets particularly when they are composed of conventional materials such as cork or asbestos or combinations thereof. These materials are subject to compression setting, that is, they lose their resiliency after a period of time and will not flexibly respond or adjust to dimensional changes in the sealing flange. Consequently, gaskets of such materials tend to rather quickly lose their sealing capabilities particularly so when maintained under elevated temperatures for lengthy periods of time.

There are other types of gasket materials conventionally employed which do not suffer from the same undesirable characteristic of compression set. These materials, generally described as elastomeric materials typified by rubbery polymers, will not compression set or if they do, will simultaneously swell under elevated temperature conditions in the presence of certain fluids such as motor oil to compensate for any such compression setting. Such elastomeric materials are obviously much more suitable than the cork or cork-type materials particularly for gasket applications where elevated temperatures exist. Nevertheless, such cork-type gaskets are still widely employed even for sealing applications which do involve such elevated temperatures. Typically, gaskets of these undesirable materials which are subject to compression setting are employed in gasket applications where the geometrical configuration of the gasket is irregular or complex and where the gasket must have provision for numerous boltholes to effect both the securing of the gasket and to provide a closing mechanism for the flange faces.

Foremost of the reasons why the inferior cork-type materials are employed for such irregularly shaped gaskets is that the conventional method used to fabricate such gaskets simply involves too great an expense when utilizing elastomeric materials. When elastomeric materials, especially synthetically prepared elastomers, are employed for gaskets having complex or irregular geometrical configurations and/or numerous bolthole openings, the elastomeric material in conventional preparation is die-cut from a flat sheet of such material to conform to the desired geometrical shape of the gasket having the requisite boltholes. This cutting, however, results in considerable waste of the elastomeric material and is the principal factor involved in the unsatisfactory economics of such preparation. For example, even with a rather simple geometrical configuration typically found in a crankcase, rocker box or valve cover gaskets, the flat sheet of elastomer must be die-cut to form a relatively narrow strip or marginal border band having a generally rectangular or circular configuration. This, however, wastes these portions of the elastomeric sheet within such border band. Moreover, when the boltholes are cut for such gaskets, there is even a further waste of the relatively expensive material.

It is, therefore, an object of this invention to provide a gasket structure which permits the economic employment of elastomeric materials thereof. Another object is to provide such a gasket particularly of irregular shape which is simple in construction and readily and economically fabricated. Still another object is to provide a method for fabricating such gasket which avoids the conventional waste of the elastomeric material employed for such gaskets. These and other objects of this invention will be apparent from the following detailed description as well as from the attached drawings.

IN THE DRAWINGS

FIG. 1 is a perspective view of a gasket according to this invention parts of which are broken away.

FIG. 2 is a section view taken on line 2—2 of FIG. 1 but on a larger scale.

FIG. 3 is a top view of another gasket of this invention having bolthole openings.

FIG. 4 is a section view on line 4—4 of FIG. 3.

FIG. 5 is a top view of another gasket of this invention.

FIG. 6 is a section view on line 6—6 of FIG. 5.

FIG. 7 is a top view of a further gasket of this invention.

FIG. 8 is a section view on line 8—8 of FIG. 7.

FIG. 9 is a fragmentary perspective view of the gasket of FIG. 3 in exaggerated form showing insertion of an elastomeric member according to the method of this invention.

In FIGS. 1 and 2, a gasket 10 according to this invention is shown essentially comprising in combination a support member 11 of sidewalls 12 and 13 interconnected at lower portions of such sidewalls by a bottom wall 14, which together with the sidewalls forms a cavity 15 in which an elastomeric member 16 is maintained in a secure and supportive arrangement. The gasket 10 is shown in generally a rectangular configuration where the support member 11 of sidewalls 12 and 13 and bottom wall 14 form a continuous narrow strip which defines a marginal border and where the elastomeric member 16 extends continuously within the cavity 15.

As indicated, one serious problem involved in using elastomeric materials for gaskets is that the elastomeric material is usually die-cut from a flat sheet and such pattern cutting results in considerable loss or waste of the valuable elastomeric material. This is particularly the case where the gasket prepared from the elastomeric material must have an irregular geometrical shape such as that used for valve cover gaskets of generally marginal border configurations such as that illustrated for gasket 10 in FIG 1. Obviously, if the flat sheet of elastomeric material is die-cut to form such a configuration, there is a considerable loss of the valuable elastomeric material located in the internal area A bounded by the marginal border of the gasket 10. This waste of material often can be more than 50 percent of the elastomeric sheet used. Such loss of the valuable elastomeric material is increased further when bolthole openings must be cut through the elastomeric material to provide passageways for the bolts which serve to close the flange sealing faces and to secure the gasket in place.

This problem of a substantial loss of valuable elastomeric material is avoided, however, and with the simultaneous obtainment of an improved gasket according to this invention basically by fabricating the gasket from one or more strips of elastomeric material which are held and maintained in a supportive arrangement by a support member having the desired irregular configuration of the gasket. This type of gasket is illustrated in simple design in FIGS. 1 and 2 where the support member 10 forms a cavity 15 which securely holds the elastomeric member 16 arranged in a marginal border configuration.

The elastomeric member 16, as more fully explained hereinafter, is composed of an elongated elastomer strip which in such form can be readily inserted into the cavity 15 and thus simply and conveniently conform to the irregular shape of the gasket 10 defined by the support member 11. This avoids any necessity for die cutting the elastomeric material from a flat sheet to such configuration with the resultant loss of valuable elastomeric material and thus achieves considerable economies in preparing such gaskets.

There can be a wide variety of gaskets of generally irregular or border configurations which can embody the essential elements according to this invention of a support member conforming an elastomeric member to such configurations. One such gasket according to the invention is illustrated in FIGS. 3 and 5 as gasket 17 which embodies certain additional features serving to maximize the benefits obtained by the gasket of this invention. In FIGS. 3 and 4, specifically, gasket 17 is illustrated again in generally a rectangular border configuration where a support member 18 of sidewalls 19 and 20 joined by bottom wall 21 collectively form an elastomer retaining cavity 22 extending as a relatively narrow strip defining a marginal border. The bottom wall 21 of such gasket 17 is provided with a series of upwardly extending hollow projections 23 generally shown in cylindrical shape, which provide a passageway through the bottom wall 21 and are adapted to receive securing bolts (not shown). The projections 23 are illustratively shown extending from the bottom wall 20 to a vertical elevation substantially equal to the upper portions of sidewalls 19 and 20.

The elastomeric member employed for such gasket 17 comprises a plurality of elastomer strips conveniently illustrated simply as two elastomer strips 24 and 25. These elongated elastomer strips 24 and 25 are inserted into the cavity 22 so that they conform to the rectangular configuration of the support member 18. At each of the projections 23, as illustrated especially in FIG. 7, the elastomer strips 24 and 25 are inserted into the cavity 22 so that they divide and pass around such projections 23 between each projection 23 and one of the sidewalls 19 or 20 in registry therewith. This arrangement eliminates the necessity of cutting any bolthole openings through the elastomer strips 24 and 25 and consequently results in substantial cost advantages for the gasket 17 when employed for gasketing applications requiring numerous boltholes.

To provide easy handling of the gasket 17, a gripping tab 26 extends outwardly from the upper portion of sidewall 19. So that the elastomer strips 24 and 25 may be securely held in the cavity 22, various means may be employed. In simplest form, a pressure fit of the elastomer strips 24 and 25 may be obtained within the cavity 22 by approximately selecting the dimensions of the elastomer strips 24 and 25 so that their cumulative volumes slightly exceed that of cavity 22. Another suitable mechanical means for gripping and holding the elastomer strips 24 and 25 securely within the cavity 22 is to provide grooves 27 on the sidewalls 19 and 20 which extend longitudinally along the walls and are dimensioned so that portions of the elastomer strips 24 and 25 can flow into such grooves 27 under pressure and thereby securely hold the elastomer strips 24 and 25 in place in a tongue and groove arrangement. Also, as a complement to such securing means, the peripheral exterior of projections 23 may be appropriately baffled or corrugated (not illustrated) to provide a further gripping engagement between the elastomer strips 24 and 25 and the support member 18.

The gasket 17 of FIG. 3 is a particularly preferred gasket of this invention, especially for gaskets requiring provision for numerous bolthole openings through the gasket. Aside from the considerable cost savings achieved according to this invention through avoidance of wasteful cutting of the elastomeric member such as strips 24 and 25 of gasket 17 to conform to the marginal border configuration and to provide numerous bolthole openings, the hollow projections 23 of gasket 17 in association with securing bolts (not shown) serve firmly to hold the gasket 17 in a fixed position between the sealing flange faces (not shown). Moreover, the resultant sidewalls 19 and 20 provide unique reinforcing in cooperation with the projection 23 to prevent any lateral blowing out or squeezing out of the gasket 17 from the sealing flange faces.

Still another gasket of this invention is illustrated by FIGS. 5 and 6 and shows a gasket 28 in generally a circular configuration. Gasket 28, analogous to gaskets 10 and 17 of FIGS. 1 and 3 respectively, is composed of a support member 29 of sidewalls 30 and 31 interconnected at lower positions thereof by a bottom wall 32 which together with the sidewalls form a cavity 33 adapted to receive and securely hold an elastomeric member 34. The gasket 28 is also equipped with bolthole openings 35 which are, however, in counterdistinction to those of gasket 17 of FIG. 3 located external to the support member 29 of such gasket 28. Such boltholes may be provided by equipping the external sidewall 30 at an upper position thereof with outward extending tabs 36 which have the openings 35 adapted to receive a securing bolt (not shown).

A still further gasket of this invention is illustrated by FIGS. 7 and 8 which show a gasket 37 particularly analogous to gasket 17 of FIG. 3. Gasket 37 is composed of a support member 38 of sidewalls 40 and 41 interconnected at lower positions thereof by a bottom wall 42 which together with the sidewalls form a cavity 43 adapted to receive and securely hold an elastomeric member 44. The bottom wall 42 is also equipped with a series of upward extending hollow projections 45 analogous to projections 23 of FIG. 7 and adapted to receive securing bolts (not shown). This gasket 37 provides a further unique arrangement for avoiding waste of the valuable elastomeric material particularly that which results from cutting bolthole openings and additionally involves a highly economical method for fabricating a crush-resistant gasket.

Gasket 37, like gasket 17, has the bolthole projections 45 located between the sidewalls 40 and 41. However, in contrast to gasket 17, the elastomeric member 44 of the gasket 37 is not divided into a plurality of elastomer strips. This elastomeric member 44 is somewhat analogous to elastomeric strip 25 of gasket 17 and passes around each of the bolthole projections 45 between the projection and the internal sidewall 41. In further reference to gasket 17 of FIG. 3, since the sealing action of the gasket 17 in many gasket applications is almost solely provided by the elastomeric strip 25 adjacent the interior wall 20, the second elastomeric strip 24 of gasket 17 can, in certain cases, be omitted. This is done in the gasket 37 of FIG. 7.

Not only does the elimination of the second strip result in substantial economies in saving the valuable elastomeric material, but in addition, it permits the low cost and simple fabrication of a gasket having a particularly desirable feature which automatically prevents any warping or distortion of the gasket during its installation between sealing flange faces (not shown). When the elastomeric member 44 of gasket 37 is not divided into a plurality of strips, as in gasket 17, open void spaces are created for gasket 37 between each projection 45 and the external sidewall 40 in registry therewith as the unitary elastomeric member 44 passes around each projection 45 between such projection and the interior sidewall 41. These void spaces allow the ready installation by simple insertion of a compression resistant insert 46 into each void space. These inserts 46 usually having a vertical dimension or height less than the height of sidewalls 40 and 41 are suitably constructed of a noncompressible material such as metal, wood, or an elastomer which is substantially less resilient than the elastomeric member 44. Because inserts 46 have such noncompressible properties, they provide a positive, automatic stop to the compression action of the sealing flange faces when the securing bolts are tightened. This automatically prevents any crushing or warping of the gasket 37 as a result of any overtightening of the bolts. The inserts 46 can have a number of different geometric configurations so as to conform properly within the cavity 43 between the projection 45 and the sidewall 40. For example, as illustrated in FIG. 7, the side of insert 46a can be straight when the adjacent sidewall 40 is straight or the side of the insert 46b can be curved when the adjacent sidewall 40 around the projection 45 is curved.

The fabrication of the gasket according to this invention is most readily and economically carried out and consists basically of providing a support member of sidewalls interconnected at lower positions thereof by a bottom wall which together with such sidewalls forms a cavity adapted to receive and to securely hold an elastomeric member. Such elastomeric member is then inserted into the cavity to complete the fabrication of the gasket.

Referring to FIGS. 3 and 4 for illustrative purposes, the support member 18 of sidewalls 19 and 20 and bottom wall 21 is advantageously fabricated from a resilient plastic material which preferably can be molded to the desired shape by application of elevated temperature and pressure. The particular resilient plastic material selected should be capable of cooperating with the elastomer strips 24 and 25 to jointly coact in forming a suitable gasket seal at the particular service conditions of temperature and pressure under which the gasket must function such as the temperature and pressure conditions associated with valve cover gaskets. Such plastic material moreover should also be rigid enough under such service conditions as a relatively thin-walled sheet to support the elastomer strips 24 and 25. Suitable materials for the purpose include polysulfones, polycarbonates, and certain cellulose plastics such as cellulose acetate or cellulose propionate or various combinations thereof.

The support member 18 can be fabricated from such plastic materials by molding according to conventional techniques such as injection, compression, or vacuum molding a strip of the desired plastic to form in one operation the sidewalls 19 and 20 and the bottom wall 21 as one unitary structure where such side and bottom walls form one continuous surface. Conveniently, and preferably, when incorporated, the bolthole projections 23 can be simultaneously formed during such molding operation by employing conventional molding techniques. This method of fabricating the support member 18 does, of course, provide an extremely easy method of preparing gaskets of highly irregular and complex configurations.

The elastomeric element of the gasket 17 which, as illustrated in FIGS. 3 and 4, comprises at least two elastomer strips 24 and 25 which can be prepared in several different ways. One method involves simply cutting elongated strips from a flat sheet of elastomeric material. This, of course, avoids any loss or waste of such elastomeric material. However, and most advantageously, the preferred method of preparing the elastomeric member such as strips 24 and 25 is to extrude such strips to form continuous, elongated strips of indefinite length. Thusly prepared, the extruded strips of indefinite lengths can then be readily inserted into the cavity 22 without any necessity for numerous cuttings to a desired length or to provide bolthole openings.

The particular shape or cross-sectional configuration of the elastomeric member preferably prepared as an extrudate can vary depending upon the particular cross-sectional configuration of the cavity 22, the number of elastomer strips employed as the elastomeric member within such cavity and the particular elastomeric material employed to fabricate the elastomeric member. Generally, however, the elastomeric member preferably has a cross-sectional configuration which readily adapts and conforms to the corresponding cross section of the cavity 22. For example, when such cavity 22, as shown in FIG. 4, has a generally U-shaped or rectangular cross section, the elastomer strips 24 and 25 have corresponding rectangular cross sections and when the cavity 22 has a cross section of generally circular shape, then the elastomer strips 24 and 25 preferably also have a circular cross section.

As indicated herein, the elastomeric member such as elastomeric strips 24 and 25 of gasket 17 of FIG. 3 are preferably continuous, that is, they extend continuously within the cavity 22. Such elastomer strips 24 and 25 may not, however, in a technical sense be endless or continuous but can, if desired, be composed of a plurality of finite lengths of elastomer which are either joined together by conventional linking means (not shown) or simply pressure-fitted together end to end within the cavity 22 so as to form a continuous elastomeric element and completely fill the length of cavity 22.

The elastomeric member such as elastomer strips 24 and 25 of gasket 17 can in general be composed of any of the elastomeric materials conventionally employed in gaskets as a resilient compressible element. Such material should, however, preferably be capable of being extruded to form an elongated, continuous strip. The particular method chosen will, of course, depend upon the specific support member employed and its degree of resiliency, as well as the particular service conditions of temperature and pressure and corrosion environment under which the gasket must operate. Suitable materials for the elastomeric member include rubbery polymers, for example, both natural and synthetic rubbers such as homopolymers or copolymers of butadiene, isoprene, and similar aliphatic conjugated diolefin hydrocarbons such as butadiene-styrene copolymer rubber, butadiene-acrylonitrile copolymer rubber, butadiene-vinylpyridine copolymer rubber, isobutylene isoprene copolymer rubber, ethylene-propylene-conjugated diolefin or nonconjugated diolefin terpolymers of polychloroprene. These rubbery polymers can according to conventional practice contain additional ingredients to modify various physical properties of the rubbery polymers such as reinforcing fabrics, cellulose modifiers or asbestos.

Fabricating or assembling the gasket according to this invention is quite uncomplicated and can be readily and economically carried out. For example, in reference to FIGS. 3 and 4 and particularly FIG. 9, a continuous elastomer strip 25 comprising, for example, an extruded rubbery polymer having a generally rectangular cross section, can be continuously inserted into a cavity 22 also having a generally rectangular cross section. Such insertion can be achieved by a simple pressure fitting of the strip 25 into the cavity 22, and during such insertion the strip 25 can be passed around each of the projections 23 between the periphery of the projection and the sidewall 20 in registry therewith. After completion of the insertion of strip 25, then the second elastomer strip 24 can be similarly inserted into cavity 22 to complete preparation of the gasket 17 without any loss of the valuable gasket material by cutting to a marginal border configuration or to provide bolthole openings. The gasket 17 thus manufactured may then be handled with relative ease and when required can readily and conveniently be inserted to seal a flange joint such as, for example, between the sealing faces of a rocker box (not shown).

This general procedure can, of course, be followed for preparing the other gaskets according to this invention with only slight deviation. For example, when preparing gasket 37, as illustrated in FIG. 7, after inserting the elastomeric member 44 in a fashion as comparably shown for elastomer strip 25 of gasket 17 in FIG. 9, the inserts 46 can simply be put in place between the projection 45 and the sidewall 40 to complete the low-cost assembly.

I claim:

1. A gasket comprising in combination an elastomeric member and a resilient support member of sidewalls spaced from each other and a bottom wall joining lower portions of the sidewalls to form a cavity for supporting the elastomeric member, said bottom wall of the support member provided with upwardly extending hollow projections adapted to receive a securing bolt wherein the elastomeric member passes around each upward extending projection between the projection and one of the sidewalls, and the space between the projection and opposite sidewall is substantially filled with an insert so as to maximize the compressive resistance about each projection.

2. The gasket of claim 1 wherein the upwardly extending hollow projections are spaced approximately midway between the sidewalls of the support member.

3. The gasket of claim 1 wherein the elastomeric member is an elastomer strip.

4. The gasket of claim 1 wherein the elastomeric member comprises a plurality of elastomer strips.

5. The gasket of claim 1 wherein the resilient support member is a plastic unitary structure wherein the side and bottom walls form one continuous surface.

6. The gasket of claim 1 wherein the walls of the support member include means for securing the elastomeric member in the cavity of the support member.

7. A gasket comprising in combination at least one elastomeric strip and a resilient plastic support member of sidewalls spaced from and positioned parallel to each other and a bottom wall joining lower portions of the sidewalls forming a unitary structure having a cavity for supporting the elastomeric strip, the bottom wall of the support member provided with upwardly extending hollow projections adapted to receive a securing bolt wherein the elastomeric strip passes around the projections on both sides thereof between the projections and sidewalls.

8. The gasket of claim 7 wherein the walls of the support member include means for securing the elastomeric strip in the cavity.

9. The gasket of claim 7 wherein the upwardly extending hollow projections are spaced approximately midway between the sidewalls of the support member.

10. The gasket of claim 7 including a plurality of elastomeric strips.

* * * * *

UNITED STATES PATENT OFFICE
CERTIFICATE OF CORRECTION

Patent No. 3,643,968          Dated February 22, 1972

Inventor(s) Guy E. Horvath

It is certified that error appears in the above-identified patent and that said Letters Patent are hereby corrected as shown below:

Col. 1, line 54, "these" should read -those-.

Col. 1, line 57, after "expensive" insert -elastomeric-.

Col. 1, line 60, "thereof" should read -therefor-.

Col. 3, line 25, "approximately" should read -appropriately-.

Col. 3, line 28, after "mechanical" insert -securing-.

Col. 3, line 48, "firmly to" should read -to firmly-.

Col. 4, line 2, "7" should read -17-.

Col. 4, line 42, "compression" should read -compressive-.

Col. 5, line 62, "method" should read -material-.

Col. 6, line 12, "a" should read -the-.

Signed and sealed this 27th day of June 1972.

(SEAL)
Attest:

EDWARD M. FLETCHER, JR.        ROBERT GOTTSCHALK
Attesting Officer                Commissioner of Patents